Feb. 13, 1940. A. O. MIDDLEMISS 2,189,958
FISH LURE
Filed Nov. 7, 1938 2 Sheets-Sheet 1
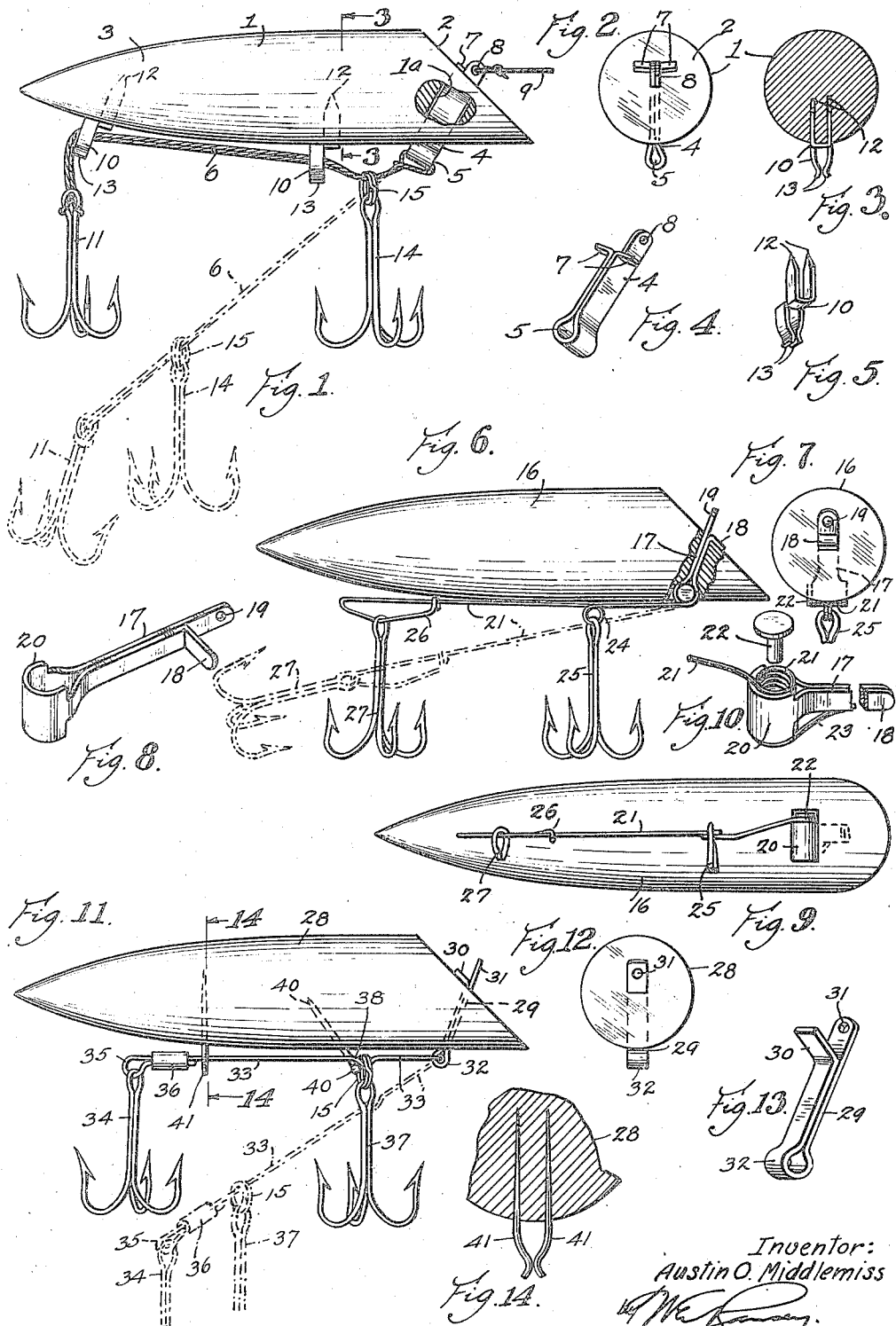
Inventor:
Austin O. Middlemiss Feb. 13, 1940. A. O. MIDDLEMISS 2,189,958
FISH LURE
Filed Nov. 7, 1938  2 Sheets-Sheet 2
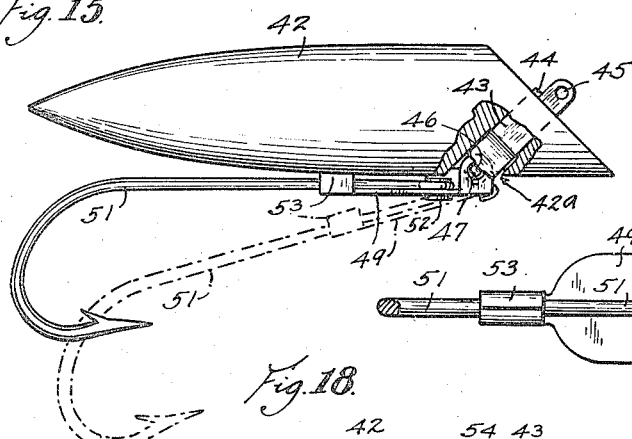
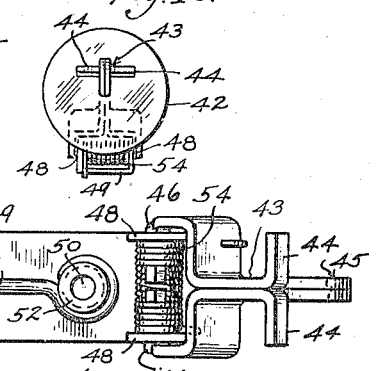
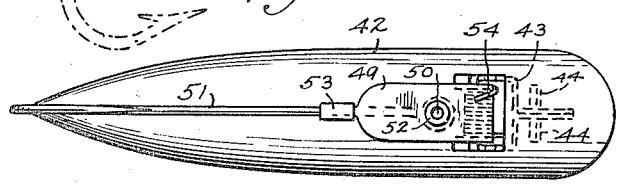
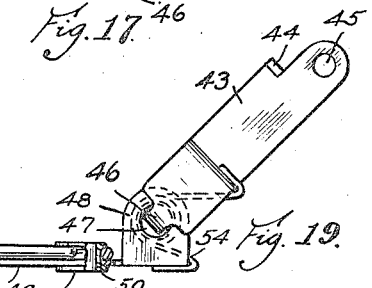
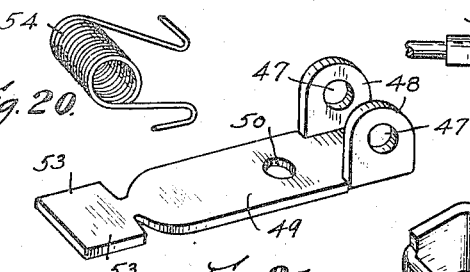
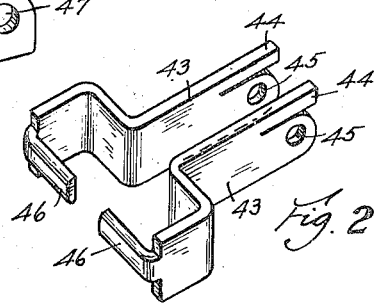
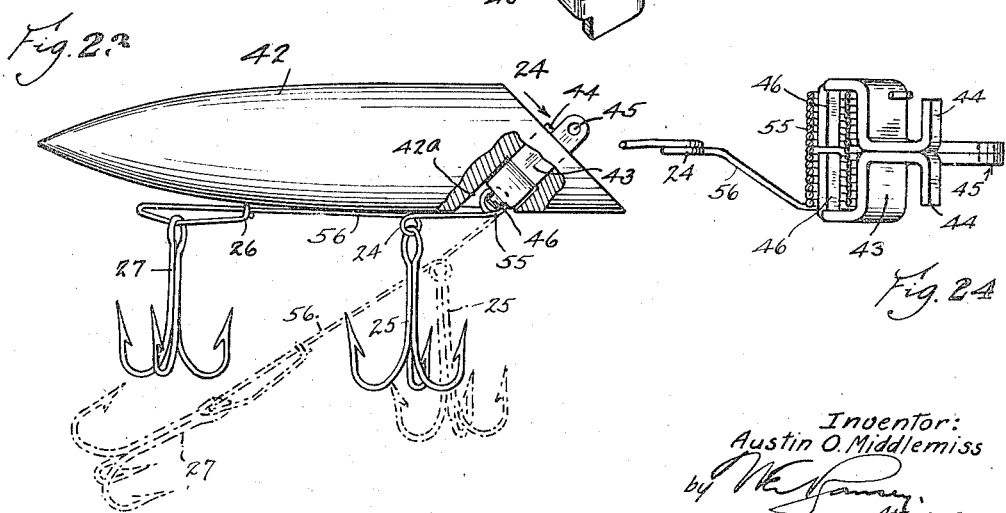
Inventor:
Austin O. Middlemiss
by
Attorney.

Patented Feb. 13, 1940

2,189,958

UNITED STATES PATENT OFFICE 2,189,958

FISH LURE

Austin O. Middlemiss, Portland, Oreg.

Application November 7, 1938, Serial No. 239,264

8 Claims. (Cl. 43—46)

My invention relates to the art of fishing and is particularly directed to the improvement of that form of plug lure wherein the plug is adapted to be spewed out, after having been taken into the fish's mouth with the hook, thereby allowing said hook to become more securely embedded in said fish's mouth. It has been found that a hook fixedly secured to a plug lure can be shaken loose by the fish quite easily. It is therefore desirable to fasten the hook detachably to the plug; but it is, of course, necessary to provide means whereby said hook remains connected to the fish line after being spaced from the plug.

The principal object of this invention is to provide improved means for permanently attaching the hook and line to the lure near the front end thereof. It has heretofore been customary to fasten the line to the lure by means of screws, and then to fasten hooks to said lure by other screws. This construction frequently resulted in the fish getting loose by pulling out either the screws that held the line to the lure or those that held the hook to the lure. Recently this difficulty has been overcome by the provision of a metal link connecting the line to the hooks, said link being partially embedded in the body of the lure. But this construction has been so expensive as to preclude its use in the cheaper grades of lures, mainly because of the labor involved in assembly, it being necessary to fasten the link in the body by cementing or by the use of some form of pin. I have devised a form of link that can be fastened securely to the body of a lure by merely bending over a tab, or tabs, provided thereon.

A further object of this invention is to provide means for attaching a hook, and the portion of fish line attached thereto, to the rearmost portion of said lure in such a way that said hook will be detached from said lure by a predetermined pull on the hook. More particularly, it is the purpose of this invention to provide an inexpensive and simple detachable securing means.

A further object of this invention is to provide spring means for holding a wire leader carrying a fishhook closely against the side of a lure, said spring means being adapted to yield under the pull of a fish on said hook, thus permitting said hook to be spaced from the body of the lure a distance sufficient to permit the latter to be spewed out of the fish's mouth while the hook remains embedded therein. This spring means is advantageous over the structures heretofore used in that the hook will automatically return to its normal position after being temporarily displaced by a fish or by some other object that might strike the hook.

A further object of my invention is to provide means for attaching a plurality of spaced hooks to a lure in such a way as said hooks will maintain their predetermined spacing during casting while, if a fish be hooked on any of said hooks, they will slide together and are adapted to be pulled away from the body of the lure. In this way hooks may be distributed along the body of the lure more certainly to hook a fish striking the same, but said hooks are separate from the lure to permit the latter to be spewed out of a fish's mouth.

A further object of my invention is to provide a lure to which the hooks, line, and leader may be readily attached or detached while fishing.

Other objects and details of my invention will be apparent from the following description of the drawings that form a part of this specification, in which:

Fig. 1 is a side elevation of a lure embodying my invention, with the hooks and leader shown in their detached position by dot-and-dash lines;

Fig. 2 is a front elevation of the structure illustrated in Fig. 1, the hooks and leader thereof not being shown;

Fig. 3 is a section taken along the line 3—3 of Fig. 1;

Fig. 4 is a perspective detail view of the link member of the lure illustrated in Fig. 1;

Fig. 5 is a perspective detail view of one of the fasteners shown in Fig. 1;

Fig. 6 is a side elevation of a lure embodying a modification of my invention, with one of the hooks and its leader shown in its extended position by dot-and-dash lines, and with a portion of the body shown broken away to disclose the link;

Fig. 7 is a front elevation of the lure illustrated in Fig. 6, only a fragment of the hooks thereof being shown;

Fig. 8 is an enlarged perspective detail view of the link member of Fig. 6;

Fig. 9 is a bottom view of the lure of Fig. 6, only fragments of the hooks being shown;

Fig. 10 is an enlarged perspective detail view of the spring member of Fig. 6, and parts associated therewith;

Fig. 11 is a side elevation of a further modification of my invention with the hooks and leader shown in their detached position by dot-and-dash lines;

Fig. 12 is a front elevation of the lure illustrated in Fig. 11, the hooks and leader thereof not being shown;

Fig. 13 is an enlarged perspective detail view of the link member of Fig. 11;

Fig. 14 is a fragmentary sectional view taken substantially on the line 14—14 of Fig. 11 showing the fastener thereof;

Fig. 15 is a side elevation of a further modification of my invention with the hook thereof shown in its extended position by dotted lines, and with a portion of the body shown broken away to disclose the parts arranged therein;

Fig. 16 is a front elevation of the lure illustrated in Fig. 15, the hook thereof not being shown;

Fig. 17 is an enlarged detail bottom view of a fragment of the hook of Fig. 15, together with the holding means thereof;

Fig. 18 is a bottom view of the structure illustrated in Fig. 15;

Fig. 19 is a side view of the structure illustrated in Fig. 17;

Fig. 20 is an enlarged perspective detail view of the spring member of Fig. 15;

Fig. 21 is an enlarged perspective detail view of the member for holding the hook of Fig. 15;

Fig. 22 is an enlarged perspective detail view of the link member of Fig. 15;

Fig. 23 is a side elevation of a further modification of my invention with parts shown broken away to disclose the link and spring members, and with the hooks and leader shown in their extended position by dot-and-dash lines;

Fig. 24 is an enlarged detail view of the link and spring elements of Fig. 23 taken substantially in the direction of the arrow 24 of said figure, part of said spring element being shown broken away to disclose details of said link element.

A fishing lure embodying my invention comprises a body member 1 having a beveled nose portion 2 and a streamlined tail portion 3. A link member 4 is inserted in a slot 1a extending transversely of the body and substantially normal to the beveled face of said nose portion. Said link has an enlarged eye 5 formed in its lower end, said eye being adapted to serve the double purpose of acting as a stop for said link by butting against said body member and of providing a place of attachment for leader 6. Two tabs 7 are formed at the upper end of said link member, said tabs being adapted to hold said link member securely in said slot of said body member when they are bent as shown in Fig. 2. In said link adjacent said tabs, a hole 8 is pierced for engaging fish line 9.

A spring clip fastener 10 for holding hook 11 and leader 6 is driven in tail portion 3 of body 1. As is shown more clearly in Fig. 5, fastener 10 has two sharpened prongs 12 adapted to be driven in body member 1, which is preferably made of some light wood such as cedar, and two jaws 13 adapted releasably to grip leader 6 and hold the same until it is pulled loose therefrom by a predetermined force. Said jaws may be of such form that they will continue their grip upon said leader under the normal tension thereof due to the drag of an empty hook, but will release it when a fish is hooked. I prefer to construct said fastener of some material such as phosphor bronze or stainless steel.

Near the middle of body member 1, I prefer to attach another fastener 10 to hold a second hook 14 in spaced relation to hook 11. Said hook 14 may be slidably mounted on leader 6 by means of a split ring 15. It will be understood that, when a fish is caught on hook 14, the latter will slide along the leader, as shown in dot-and-dash lines in Fig. 1, releasing the leader from both fasteners and effectively separating said hooks from the body of the lure permitting the latter to be spewed out of the fish's mouth. Of course, if the fish is caught on hook 11, a similar result will follow. This result of freeing the body of the lure from the mouth of the fish is desirable because said body would tend to dislodge the hook or to prevent it from becoming firmly embedded, if it were left in said fish's mouth, and because said body would then be scratched by the fish's teeth. The latter is a matter of importance particularly when the body of the lure is made of some soft material such as cedar wood.

In the modification of my invention illustrated in Figs. 6 to 10, a body 16 carries near its forward end a link 17 secured therein by bending tab 18 to the position in which it is shown in Fig. 6. A hole 19 pierced near the end of said link is adapted to receive a fish line, and an enlarged eye 20 formed at the lower end of said link is adapted to be drawn firmly against said body 16 before said tab is bent down. Eye 20 also serves to engage spring 21 which is held in place by pin 22. It will be seen that pin 22 will be held in eye 20 when the latter is in its place, countersunk into body 16.

Spring 21 consists of a piece of spring wire bent in a spiral form around pin 22. At one end of the spiral a short end of wire 23 is adapted to engage body 16. The spiral is tightly wound so that the wire at the other end of the spiral is pressed firmly against said body in the opposite direction. Said last mentioned end of wire is of substantial length and takes the place of the leader ordinarily used. In it a loop 24 is formed a short distance from the spiral, said loop being adapted to engage a fishhook 25. At the end of said leader portion of the wire, a clasp 26 is adapted to receive another hook 27. It will be seen that both hooks can readily be threaded along said wire to their respective positions, after which the clasp may be fastened. As mentioned, this structure is advantageous in that the hooks are automatically returned to their normal position after having been displaced therefrom.

Referring next to the modification shown in Figs. 11 to 14: A body 28 carries a link 29 near the front end thereof, said link being adapted to be held securely in place by bending a tab 30 to the position shown in Fig. 11. A hole 31 pierced near the end of said link is adapted to engage a fish line, and an enlarged eye 32 formed at the lower end thereof is adapted to engage leader 33. Said eye also serves as a stop for said link by engaging body 28. A fishhook 34 is adapted to be attached to leader 33 by loop 35 closed by slide fastener 36. Another fishhook 37 is adapted to be slidably carried on said leader by a split ring 15.

When the lure is in position to be struck by a fish, said ring 15 is intended to rest in a crescent-shaped bend 38 in wire leader 33. The projecting head and brad 40 obliquely driven into body 28 is adapted to hold said ring in bend 38. However, when a fish strikes either hook 34 or 37, leader 33 will be pulled away from body 28 thereby disengaging said ring 15 from brad 40 and permitting said ring, and the hook carried thereby, to slide along said leader to hook 34. Thus, when a fish strikes either hook, said hook will be spaced from the body of the lure for the purposes hereinbefore described. Before the fish strikes the hook, leader 33 may be held against body 28 by a pair of sharpened gripping fingers 41 adapted to be driven into body 28. Said fingers may, if desired, be formed after being driven by pressing them together so that the proper tension in said leader will release the leader from their grip.

Referring now to the modification illustrated in Figs. 15 to 22, inclusive: Body member 42 carries near its forward end a link 43 adapted to be securely fastened to said body by being inserted in a slot 42a therein and by bending down tabs 44 to the position in which they are shown in Fig. 17. Said link comprises two halves, shown more clearly in Fig. 22, having a hole 45 pierced near one end thereof, said hole being adapted to receive a fish line. Each half of link 43 has formed at its lower end a trunnion 46 adapted to engage holes 47 in upturned lugs 48 of hook base 49. Said base 49 has a hole 50 to which a hook 51 may be attached by an eyelet 52. Said hook may be secured more firmly to base 49 by means of clasps 53, shown in open position in Fig. 21 and in closed position in Fig. 17.

Before trunnions 46 are inserted in holes 47, a coiled spring may be inserted between lugs 48, as is shown more clearly in Fig. 17. One end of said spring may be hooked over one side of link 43, and the other over hook base member 49. Said spring may be coiled tightly enough to exert sufficient force on said base member to hold hook 51 against body member 42 normally, but to permit said hook and body member to separate when a fish is caught on said hook for the purposes hereinbefore set forth.

Referring to the modification illustrated in Figs. 23 and 24: Link 43 in body 42 is adapted to engage coil spring 55 formed in the end of wire leader 56, said spring being adapted to hold said leader against body member 42 in a similar way and for the same purpose that spring 21 is held against body member 16 in Fig. 6. Leader 56 differs from spring 21 only in that the coiled end portion is formed to engage differently shaped members.

I have herein described and illustrated a lure of the plug type and it is to such type that my invention is particularly directed. Such lures are commonly made with a body of some light wood such as cedar. They are usually painted in bright colors to make them water resistant and to imitate a fish, frog, mouse, or some other object that might be struck by the fish to be caught. Some means may be provided to cause said lure to pursue a zig-zag course through the water; for this purpose, the beveled nose portion of the bodies of the lures herein disclosed may be made slightly concave. It will be understood that, while my invention is particularly directed to the form of lure herein described and illustrated, it is not limited thereto. For example, my invention might be usefully applied to a lure having a body not only painted to resemble some object such as a frog, but also shaped to resemble said object. Also, it will be apparent that some features of my invention may be used with lure bodies made of material other than wood, such for example as an aluminum alloy.

My invention is particularly useful in connection with the use of triple pronged hooks, such as are illustrated at 37 in Fig. 11. When such a hook is fixedly secured to the body of a lure, it has a tendency to turn with two of its hooks against said body, only the single, third hook then being effective to engage a fish's mouth. However, by my invention, said triple pronged hook will, when struck by a fish, be separated from said body so that all three of its prongs may be effective.

In some states, laws forbid the use of certain types of hooks with plug-type lures. With the exception of the modification shown in Figs. 15 to 22, my invention permits hooks to be changed readily to comply with the laws of the state in which it is used. The hooks of plug lures provided with a plurality of hooks have not heretofore been readily removed and replaced.

I claim:

1. A fishing lure comprising an elongated body member having a transverse slot formed therein, a link member fixed in said slot, having an enlargement at one end and a bent-over tab at the other end of said link, one end of said link member being provided with a fishing line connection, a leader attached to said link member at the end thereof opposite said fishing line connection, said leader being adapted to carry a fishhook at its free end, and a fastener driven into said body for releasably engaging said leader intermediate its ends thereby to hold said leader closely alongside said body.

2. A fishing lure comprising an elongated body member having a transverse slot formed therein, a link member fixed in said slot, having an enlargement at one end and a bent-over tab at the other end of said link, one end of said link member being provided with a fishing line connection, a relatively stiff leader attached to said link member at the end thereof opposite said fishing line connection, and spring means tending to hold said leader alongside said body, said leader having a clasp formed at one end thereof for engaging a fishhook.

3. A fishing lure comprising an elongated body member having a transverse slot formed therein, a link member fixed in said slot, having an enlargement at one end and a bent-over tab at the other end of said link, one end of said link member being provided with a fishing line connection, a relatively stiff leader attached to said link member at the end thereof opposite said fishing line connection, said leader being adapted to carry a fishhook at its free end, and spring means secured to said leader adjacent the attached end thereof, tending to hold said leader alongside said body.

4. A fishing lure comprising an elongated body member having a transverse slot formed therein, a link member fixed in said slot, having an enlargement at one end and a bent-over tab at the other end of said link, one end of said link member being provided with a fishing line connection, a relatively stiff leader attached to said link member at the end thereof opposite said fishing line connection, and a fastener driven into said body for releasably engaging said leader intermediate its ends thereby to hold said leader closely alongside said body, said leader having a clasp formed at one end thereof for engaging a fishhook, said leader having a crescent-shaped bend spaced from said clasp for engaging a second fishhook.

5. A fishing lure comprising an elongated body member having a transverse slot formed therein, a link member fixed in said slot, having an enlargement at one end and a bent-over tab at the other end of said link, one end of said link member being provided with a fishing line connection, a relatively stiff leader attached to said link member at the end thereof opposite said fishing line connection, a fastener driven into said body for releasably engaging said leader intermediate its ends thereby to hold said leader closely alongside said body, said leader having a clasp formed at one end thereof for engaging a fishhook, said leader having a formed crescent-shaped bend spaced from said clasp for engaging a second fishhook, a second fishhook slidably mounted on said leader, and a brad driven obliquely into said body its head extending laterally therefrom immediately adjacent said bend, thereby adapted for releasably holding said slidably mounted fishhook in said bend.

6. In a fishing lure comprising an elongated body member having a transverse slot formed therein, a link member fixed in said slot having an enlargement at one end and a bent-over tab at the other end of said link, one end of said link member being provided with a fishing line connection, a base member hingedly connected to said link member at the end thereof opposite said fishing line connection, a fishhook secured to said base member, and spring means operatively connected to said base member and to said link for yieldably holding said hook alongside said body member.

7. In a fishing lure comprising an elongated body member having a transverse slot formed therein, a link member fixed in said slot, having an enlargement at one end and a bent-over tab at the other end of said link, one end of said link member being provided with a fishing line connection, and a base member for a fishhook hingedly connected to said link member at the end thereof opposite said fishing line connection.

8. In a fishing lure comprising an elongated body member having a transverse slot formed therein, a link member fixed in said slot, having an enlargement at one end and a bent-over tab at the other end of said link, one end of said link member being provided with a fishing line connection, a base member for a fishhook hingedly connected to said link member at the end thereof opposite said fishing line connection, and spring means operatively connected to said base member and to said link for yieldably holding said hook alongside said body member.

AUSTIN O. MIDDLEMISS.